US012675517B2

(12) United States Patent
Perez et al.

(10) Patent No.: US 12,675,517 B2
(45) Date of Patent: Jul. 7, 2026

(54) MODEL GLOBALIZATION FOR LONG DOCUMENT SUMMARIZATION

(71) Applicant: NAVER CORPORATION, Gyeonggi-do (KR)

(72) Inventors: Julien Perez, Grenoble (FR); Quentin Grail, Meylan (FR); Eric Jacques Guy Gaussier, Grenoble (FR)

(73) Assignee: NAVER CORPORATION, Gyeonggi-Do (KR)

( * ) Notice: Subject to any disclaimer, the term of this patent is extended or adjusted under 35 U.S.C. 154(b) by 32 days.

(21) Appl. No.: 17/592,164

(22) Filed: Feb. 3, 2022

(65) Prior Publication Data

US 2023/0244706 A1 Aug. 3, 2023

(51) Int. Cl.
| | |
|---|---|
| *G06F 16/34* | (2025.01) |
| *G06F 40/284* | (2020.01) |
| *G06N 3/045* | (2023.01) |

(52) U.S. Cl.
CPC .......... *G06F 16/345* (2019.01); *G06F 40/284* (2020.01); *G06N 3/045* (2023.01)

(58) Field of Classification Search
None
See application file for complete search history.

(56) References Cited

U.S. PATENT DOCUMENTS

| | | | | |
|---|---|---|---|---|
| 10,255,273 | B2 * | 4/2019 | Chakraborty | ....... G06F 16/3344 |
| 10,831,834 | B2 * | 11/2020 | Zheng | .................. G06F 40/258 |

| | | | | |
|---|---|---|---|---|
| 11,170,158 | B2 * | 11/2021 | Cohan | .................. G06F 40/274 |
| 11,392,651 | B1 * | 7/2022 | McClusky | ............ G06F 40/295 |
| 11,475,210 | B2 * | 10/2022 | de Oliveira | .............. G06N 3/04 |
| 11,500,917 | B2 * | 11/2022 | Wu | ..................... G06F 16/3329 |
| 11,545,156 | B2 * | 1/2023 | Zeng | ...................... G06N 20/00 |
| 11,681,872 | B2 * | 6/2023 | Meng | ..................... G06N 3/044 |
| | | | | 704/9 |
| 11,829,884 | B2 * | 11/2023 | Rae | ....................... G06N 3/0455 |
| 12,033,618 | B1 * | 7/2024 | Wei | ......................... G10L 15/16 |
| 2017/0213130 | A1 * | 7/2017 | Khatri | ................... G06N 3/044 |
| 2018/0365220 | A1 * | 12/2018 | Chakraborty | ........... G06F 40/30 |
| 2019/0278835 | A1 * | 9/2019 | Cohan | .................. G06F 40/289 |
| 2020/0167391 | A1 * | 5/2020 | Zheng | ................ G06F 16/3347 |

(Continued)

OTHER PUBLICATIONS

Grail, Quentin et al. "Globalizing BERT-based Transformer Architectures for Long Document Summarization", pp. 1792-1810, Apr. 2021, Association for Computational Linguistics. <https://aclanthology.org/2021.eacl-main.154/> (Year: 2021).*

(Continued)

*Primary Examiner* — Tamara T Kyle
*Assistant Examiner* — Tyler Schallhorn

(57) ABSTRACT

A summarization system includes: K embedding modules configured to: receive K blocks of text, respectively, of a document to be summarized; and generate K first representations based on the K blocks of text, respectively, where K is an integer greater than 2; a first propagation module configured to generate second representations based on the K first representations; a second propagation module configured to generate third representations based on the second representations; an output module configured to select ones of the K blocks based on the third representations; and a summary module configured to generate a summary of the document from text of the selected ones of the K blocks.

24 Claims, 11 Drawing Sheets

(56) References Cited

U.S. PATENT DOCUMENTS

| | | | | |
|---|---|---|---|---|
| 2020/0320116 A1* | 10/2020 | Wu | | G06F 16/438 |
| 2020/0320370 A1* | 10/2020 | Khatri | | G06N 3/044 |
| 2021/0089829 A1* | 3/2021 | Rae | | G06N 3/0455 |
| 2021/0319181 A1* | 10/2021 | Meng | | G06N 3/045 |
| 2021/0342718 A1* | 11/2021 | Park | | G06N 20/00 |
| 2021/0375291 A1* | 12/2021 | Zeng | | H04L 67/306 |
| 2021/0390127 A1* | 12/2021 | Fox | | G06F 40/289 |
| 2021/0406320 A1* | 12/2021 | Nahamoo | | G06F 16/93 |
| 2022/0058345 A1* | 2/2022 | Guo | | G06F 40/253 |
| 2022/0067269 A1* | 3/2022 | de Oliveira | | G06F 40/35 |
| 2022/0309254 A1* | 9/2022 | Kotnis | | G06N 3/045 |
| 2022/0343195 A1* | 10/2022 | Park | | G06N 5/04 |
| 2023/0206645 A1* | 6/2023 | Lee | | G06V 10/44 |
| | | | | 382/181 |

OTHER PUBLICATIONS

Zhang, Ruixuan et al. "BERT-AL: BERT for Arbitrarily Long Document Understanding", pp. 1-10, Sep. 25, 2019, International Conference on Learning Representations. <https://openreview.net/forum?id=SkInVAEFDB> (Year: 2019).*

Nallapati, Ramesh et al. "SummaRuNNer: A Recurrent Neural Network Based Sequence Model for Extractive Summarization of Documents" (pp. 3075-3081) from Proceedings of the 31st AAAI Conference on AI (AAAI-17), Feb. 12, 2017 <https://doi.org/10.1609/aaai.v31i1.10958> (Year: 2017).*

Sheng, Deming et al. "An Efficient Long Chinese Text Sentiment Analysis Method Using BERT-Based Models with BiGRU", May 28, 2021, IEEE. <https://doi.org/10.1109/CSCWD49262.2021.9437789> (Year: 2021).*

Gupta, Ankit et al. GMAT: Global Memory Augmentation for Transformers. Jun. 5, 2020, pp. 1-12, [retrieved on Feb. 18, 2025]. Retrieved from <https://arxiv.org/abs/2006.03274> <doi:10.48550/arXiv.2006.03274> (Year: 2020).*

Yang, Liu et al. Beyond 512 Tokens: Siamese Multi-depth Transformer-based Hierarchical Encoder for Long-Form Document Matching, CIKM '20: Proc. of the 29th ACM Intl. Conf. on Info. & Knowl. Mgmt., Oct. 19, 2020, pp. 1725-1734 [retrieved on May 29, 2025] <https://doi.org/10.1145/3340531.3411908> (Year: 2020).*

Yin, Xing et al. "Sentiment analysis based on BiGRU information enhancement", pp. 1-9, in Journal of Physics: Conference Series vol. 1748. Jan. 2021, IOP Publishing. <https://doi.org/10.1088/1742-6596/1748/3/032054> (Year: 2021).*

Sanghwan Bae, Taeuk Kim, Jihoon Kim, and Sanggoo Lee. 2019. Summary level training of sentence rewriting for abstractive summarization. CoRR, abs/1909.08752.

Iz Beltagy, Matthew E. Peters, and Arman Cohan. 2020. Longformer: The long-document transformer. CoRR, abs/2004.05150.

Ming-Wei Chang, Kristina Toutanova, Kenton Lee, and Jacob Devlin. 2019. Language model pre-training for hierarchical document representations. CoRR, abs/1901.09128.

Jianpeng Cheng and Mirella Lapata. 2016. Neural summarization by extracting sentences and words. In Proceedings of the 54th Annual Meeting of the Association for Computational Linguistics (vol. 1: Long Papers), pp. 484-494, Berlin, Germany. Association for Computational Linguistics.

Rewon Child, Scott Gray, Alec Radford, and Ilya Sutskever. 2019. Generating long sequences with sparse transformers. CoRR, abs/1904.10509.

Kyunghyun Cho, Bart van Merriënboer, Caglar Gulcehre, Dzmitry Bahdanau, Fethi Bougares, Holger Schwenk, and Yoshua Bengio. 2014. Learning phrase representations using RNN encoder-decoder for statistical machine translation. In Proceedings of the 2014 Conference on Empirical Methods in Natural Language Processing (EMNLP), pp. 1724-1734, Doha, Qatar. Association for Computational Linguistics.

Arman Cohan, Franck Dernoncourt, Doo Soon Kim, Trung Bui, Seokhwan Kim, Walter Chang, and Nazli Goharian. 2018. A discourse-aware attention model for abstractive summarization of long documents. In Proceedings of the 2018 Conference of the North American Chapter of the Association for Computational Linguistics: Human Language Technologies, NAACL-HLT, New Orleans, Louisiana, USA, Jun. 1-6, 2018, vol. 2 (Short Papers), pp. 615-621. Association for Computational Linguistics.

Gonçalo M. Correia, Vlad Niculae, and Andre F. T. Martins. 2019. Adaptively sparse transformers. In Proceedings of the 2019 Conference on Empirical Methods in Natural Language Processing and the 9th International Joint Conference on Natural Language Processing, EMNLP-IJCNLP 2019, Hong Kong, China, Nov. 3-7, 2019, pp. 2174-2184. Association for Computational Linguistics.

Zihang Dai, Zhilin Yang, Yiming Yang, Jaime G. Carbonell, Quoc Viet Le, and Ruslan Salakhutdinov. 2019. Transformer-xl: Attentive language models beyond a fixed-length context. In Proceedings of the 57th Conference of the Association for Computational Linguistics, ACL 2019, Florence, Italy, Jul. 28-Aug. 2, 2019, vol. 1: Long Papers, pp. 2978-2988. Association for Computational Linguistics.

Jacob Devlin, Ming-Wei Chang, Kenton Lee, and Kristina Toutanova. 2019. BERT: Pre-training of Deep Bidirectional Transformers for Language Understanding. In Proceedings of the 2019 Conference of the North American Chapter of the Association for Computational Linguistics: Human Language Technologies, vol. 1 (Long and Short Papers), pp. 4171-4186. Association for Computational Linguistics.

Günes Erkan and Dragomir R. Radev. 2004. Lexrank: Graph-based lexical centrality as salience in text summarization. J. Artif. Int. Res., 22(1):457-479.

Yuwei Fang, Siqi Sun, Zhe Gan, Rohit Pillai, Shuohang Wang, and Jingjing Liu. 2019. Hierarchical graph network for multi-hop question answering. CoRR, abs/1911.03631.

Alexios Gidiotis and Grigorios Tsoumakas. 2020. A divide-and-conquer approach to the summarization of long documents.

Karl Moritz Hermann, Tomas Kocisky, Edward Grefenstette, Lasse Espeholt, Will Kay, Mustafa Suleyman, and Phil Blunsom. 2015. Teaching machines to read and comprehend. In Advances in Neural Information Processing Systems, vol. 28, pp. 1693-1701. Curran Associates, Inc.

Mandar Joshi, Omer Levy, Luke Zettlemoyer, and Daniel S. Weld. 2019. BERT for coreference resolution: Baselines and analysis. In Proceedings of the 2019 Conference on Empirical Methods in Natural Language Processing and the 9th International Joint Conference on Natural Language Processing, EMNLP-IJCNLP 2019, Hong Kong, China, Nov. 3-7, 2019, pp. 5802-5807. Association for Computational Linguistics.

M Kamio, Akira Meguro, Masao Ota, N Nomura, Kenji Kashiwagi, F Mabuchi, Hiroyuki Iijima, K Kawase, T Yamamoto, M Nakamura, Akira Negi, T Sagara, Teruo Nishida, M Inatani, Hidenobu Tanihara, M Aihara, M Araie, Takeo Fukuchi, H Abe, and Nakamura Mizuki. 2009. Investigation of the association between the glc3a locus and normal tension glaucoma in Japanese patients by microsatellite analysis. Clinical ophthalmology (Auckland, N.Z.), 3:183-8.

Chris Kedzie, Kathleen Mckeown, and Hal Daumé III. 2018. Content selection in deep learning models of summarization. In Proceedings of the 2018 Conference on Empirical Methods in Natural Language Processing, pp. 1818-1828, Brussels, Belgium. Association for Computational Linguistics.

Diederik P. Kingma and Jimmy Ba. 2015. Adam: A method for stochastic optimization. In 3rd International Conference on Learning Representations, ICLR 2015, San Diego, CA, USA, May 7-9, 2015, Conference Track Proceedings.

Nikita Kitaev, Lukasz Kaiser, and Anselm Levskaya. 2020. Reformer: The efficient transformer. In 8th International Conference on Learning Representations, ICLR 2020, Addis Ababa, Ethiopia, Apr. 26-30, 2020. OpenReview.net.

Omri Koshorek, Adir Cohen, Noam Mor, Michael Rotman, and Jonathan Berant. 2018. Text segmentation as a supervised learning task. In Proceedings of the 2018 Conference of the North American Chapter of the Association for Computational Linguistics: Human Language Technologies, vol. 2 (Short Papers), pp. 469-473, New Orleans, Louisiana. Association for Computational Linguistics.

Julian Kupiec, Jan Pedersen, and Francine Chen. 1995. A trainable document summarizer. In Proceedings of the 18th Annual International ACM SIGIR Conference on Research and Development in

(56) References Cited

OTHER PUBLICATIONS

Information Retrieval, SIGIR '95, p. 68-73, New York, NY, USA. Association for Computing Machinery.

Zhenzhong Lan, Mingda Chen, Sebastian Goodman, Kevin Gimpel, Piyush Sharma, and Radu Soricut. 2020. Albert: A lite bert for self-supervised learning of language representations. In International Conference on Learning Representations.

Chin-Yew Lin. 2004. ROUGE: A package for automatic evaluation of summaries. In Text Summarization Branches Out, pp. 74-81, Barcelona, Spain. Association for Computational Linguistics.

Yang Liu and Mirella Lapata. 2019a. Hierarchical transformers for multi-document summarization. In Proceedings of the 57th Conference of the Association for Computational Linguistics, ACL 2019, Florence, Italy, Jul. 28-Aug. 2, 2019, vol. 1: Long Papers, pp. 5070-5081. Association for Computational Linguistics.

Yang Liu and Mirella Lapata. 2019b. Text summarization with pretrained encoders. In Proceedings of the 2019 Conference on Empirical Methods in Natural Language Processing and the 9th International Joint Conference on Natural Language Processing (EMNLP-IJCNLP), pp. 3730-3740, Hong Kong, China. Association for Computational Linguistics.

Yang Liu, Ivan Titov, and Mirella Lapata. 2019a. Single document summarization as tree induction. In Proceedings of the 2019 Conference of the North American Chapter of the Association for Computational Linguistics: Human Language Technologies, vol. 1 (Long and Short Papers), pp. 1745-1755, Minneapolis, Minnesota. Association for Computational Linguistics.

Yinhan Liu, Myle Ott, Naman Goyal, Jingfei Du, Mandar Joshi, Danqi Chen, Omer Levy, Mike Lewis, Luke Zettlemoyer, and Veselin Stoyanov. 2019b. Roberta: A robustly optimized BERT pretraining approach. CoRR, abs/1907.11692.

Ramesh Nallapati, Bowen Zhou, Cicero dos Santos, Çağlar Gulçehre, and Bing Xiang. 2016. Abstractive text summarization using sequence-to-sequence RNNs and beyond. In Proceedings of The 20th SIGNLL Conference on Computational Natural Language Learning, pp. 280-290, Berlin, Germany. Association for Computational Linguistics.

Shashi Narayan, Shay B. Cohen, and Mirella Lapata. 2018. Don't give me the details, just the summary! topic-aware convolutional neural networks for extreme summarization. In Proceedings of the 2018 Conference on Empirical Methods in Natural Language Processing, Brussels, Belgium, Oct. 31-Nov. 4, 2018, pp. 1797-1807. Association for Computational Linguistics.

Rodrigo Nogueira and Kyunghyun Cho. 2019. Passage re-ranking with Bert. Corr, abs/1901.04085.

Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala. 2019. Pytorch: An imperative style, high-performance deep learning library. In Advances in Neural Information Processing Systems 32: Annual Conference on Neural Information Processing Systems 2019, NeurIPS 2019, Dec. 8-14, 2019, Vancouver, BC, Canada, pp. 8024-8035.

Romain Paulus, Caiming Xiong, and Richard Socher. 2018. A deep reinforced model for abstractive summarization. In 6th International Conference on Learning Representations, ICLR 2018, Vancouver, BC, Canada, Apr. 30-May 3, 2018, Conference Track Proceedings. OpenReview.net.

Alec Radford, Jeffrey Wu, Rewon Child, David Luan, Dario Amodei, and Ilya Sutskever. 2018. Language models are unsupervised multitask learners.

Pranav Rajpurkar, Jian Zhang, Konstantin Lopyrev, and Percy Liang. 2016. Squad: 100,000+ questions for machine comprehension of text. In Proceedings of the 2016 Conference on Empirical Methods in Natural Language Processing, EMNLP 2016, Austin, Texas, USA, Nov. 1-4, 2016, pp. 2383-2392. The Association for Computational Linguistics.

Abigail See, Peter J. Liu, and Christopher D. Manning. Get To The Point: Summarization with Pointer-Generator Networks. In Proceedings of the 55th Annual Meeting of the Association for Computational Linguistics (vol. 1: Long Papers), pp. 1073-1083. Association for Computational Linguistics.

Josef Steinberger and Karel Jezek. 2004. Using latent semantic analysis in text summarization and summary evaluation.

Sandeep Subramanian, Raymond Li, Jonathan Pilault, and Christopher J. Pal. 2019. On extractive and abstractive neural document summarization with transformer language models. CoRR, abs/1909.03186.

Sainbayar Sukhbaatar, Edouard Grave, Piotr Bojanowski, and Armand Joulin. 2019. Adaptive attention span in transformers. In Proceedings of the 57th Conference of the Association for Computational Linguistics, ACL 2019, Florence, Italy, Jul. 28-Aug. 2, 2019, vol. 1: Long Papers, pp. 331-335. Association for Computational Linguistics.

Ming Tu, Kevin Huang, Guangtao Wang, Jing Huang, Xiaodong He, and Bowen Zhou. 2019. Select, answer and explain: Interpretable multi-hop reading comprehension over multiple documents. CoRR, abs/1911.00484.

Ming Tu, Kevin Huang, Guangtao Wang, Jing Huang, Xiaodong He, and Bowen Zhou. 2020. Select, answer and explain: Interpretable multi-hop reading comprehension over multiple documents. National conference on artificial intelligence.

Lucy Vanderwende, Hisami Suzuki, Chris Brockett, and Ani Nenkova. 2007. Beyond sumbasic: Taskfocused summarization with sentence simplification and lexical expansion. Inf. Process. Manag., 43(6):1606-1618.

Ashish Vaswani, Noam Shazeer, Niki Parmar, Jakob Uszkoreit, Llion Jones, Aidan N. Gomez, Lukasz Kaiser, and Illia Polosukhin. 2017. Attention is all you need. In Advances in Neural Information Processing Systems 30: Annual Conference on Neural Information Processing Systems 2017, Dec. 4-9, 2017, Long Beach, CA, USA, pp. 5998-6008.

Alex Wang, Amanpreet Singh, Julian Michael, Felix Hill, Omer Levy, and Samuel R. Bowman. 2019. GLUE: A multi-task benchmark and analysis platform for natural language understanding. In International Conference on Learning Representations.

Thomas Wolf, Lysandre Debut, Victor Sanh, Julien Chaumond, Clement Delangue, Anthony Moi, Pierric Cistac, Tim Rault, Rémi Louf, Morgan Funtowicz, and Jamie Brew. 2019. Huggingface's transformers: State-of-the-art natural language processing. ArXiv, abs/1910.03771.

Zhilin Yang, Peng Qi, Saizheng Zhang, Yoshua Bengio, William W. Cohen, Ruslan Salakhutdinov, and Christopher D. Manning. 2018. Hotpotqa: A dataset for diverse, explainable multi-hop question answering. In Proceedings of the 2018 Conference on Empirical Methods in Natural Language Processing, Brussels, Belgium, Oct. 31-Nov. 4, 2018, pp. 2369-2380. Association for Computational Linguistics.

Zichao Yang, Diyi Yang, Chris Dyer, Xiaodong He, Alex Smola, and Eduard Hovy. 2016. Hierarchical attention networks for document classification. In Proceedings of the 2016 Conference of the North American Chapter of the Association for Computational Linguistics: Human Language Technologies, pp. 1480-1489, San Diego, California. Association for Computational Linguistics.

Manzil Zaheer, Guru Guruganesh, Avinava Dubey, Joshua Ainslie, Chris Alberti, Santiago Ontanon, Philip Pham, Anirudh Ravula, QifanWang, Li Yang, and Amr Ahmed. 2020. Big bird: Transformers for longer sequences.

Rowan Zellers, Yonatan Bisk, Roy Schwartz, and Yejin Choi. 2018. SWAG: A large-scale adversarial dataset for grounded commonsense inference. CoRR, abs/1808.05326.

Jingqing Zhang, Yao Zhao, Mohammad Saleh, and Peter J. Liu. 2019a. Pegasus: Pre-training with extracted gap-sentences for abstractive summarization.

Xingxing Zhang, Mirella Lapata, Furu Wei, and Ming Zhou. 2018. Neural latent extractive document summarization. In Proceedings of the 2018 Conference on Empirical Methods in Natural Language Processing, pp. 779-784, Brussels, Belgium. Association for Computational Linguistics.

(56) References Cited

OTHER PUBLICATIONS

Xingxing Zhang, Furu Wei, and Ming Zhou. 2019b. HIBERT: document level pre-training of hierarchical bidirectional transformers for document summarization. In Proceedings of the 57th Conference of the Association for Computational Linguistics, ACL 2019, Florence, Italy, Jul. 28-Aug. 2, 2019, vol. 1: Long Papers, pp. 5059-5069. Association for Computational Linguistics.

Chen Zhao, Chenyan Xiong, Corby Rosset, Xia Song, Paul N. Bennett, and Saurabh Tiwary. 2020. Transformer-xh: Multi-evidence reasoning with extra hop attention. In 8th International Conference on Learning Representations, ICLR 2020, Addis Ababa, Ethiopia, Apr. 26-30, 2020. OpenReview.net.

Ming Zhong, Pengfei Liu, Yiran Chen, Danqing Wang, Xipeng Qiu, and Xuanjing Huang. 2020. Extractive summarization as text matching. In Proceedings of the 58th Annual Meeting of the Association for Computational Linguistics, pp. 6197-6208, Online. Association for Computational Linguistics.

Ming Zhong, Pengfei Liu, Danqing Wang, Xipeng Qiu, and Xuanjing Huang. 2019. Searching for effective neural extractive summarization: What works and what's next. In Proceedings of the 57th Conference of the Association for Computational Linguistics, ACL 2019, Florence, Italy, Jul. 28-Aug. 2, 2019, vol. 1: Long Papers, pp. 1049-1058. Association for Computational Linguistics.

Qingyu Zhou, Nan Yang, Furu Wei, Shaohan Huang, Ming Zhou, and Tiejun Zhao. 2018. Neural document summarization by jointly learning to score and select sentences. In Proceedings of the 56th Annual Meeting of the Association for Computational Linguistics (vol. 1: Long Papers), pp. 654-663, Melbourne, Australia. Association for Computational Linguistics.

Yukun Zhu, Ryan Kiros, Richard S. Zemel, Ruslan Salakhutdinov, Raquel Urtasun, Antonio Torralba, and Sanja Fidler. 2015. Aligning books and movies: Towards story-like visual explanations by watching movies and reading books. In 2015 IEEE International Conference on Computer Vision, ICCV 2015, Santiago, Chile, Dec. 7-13, 2015, pp. 19-27. IEE Computer Society.

Jianfeng Deng, Lianglun Cheng, and Zhuowei Wang. 2020. Self-attention-based BiGRU and capsule network for named entity recognition. 2020 arXiv:2002.00735v1: Jan. 30, 2020.

Sinong Wang, Belinda Z. Li, Madian Khabsa, Han Fang, Hao Ma. Linformer: Self-Attention with Linear Complexity. 2020 arXiv:2006. 04768v3: Jun. 14, 2020.

Yang Liu and Mirella Lapata: "Text Summarization with Pretrained Encoders." Proceedings of the 2019 Conference on Empirical Methods in Natural Language Processing and the 9th International Joint Conference on Natural Language Processing, pp. 3730-3740, Hong Kong, China, Nov. 3-7, 2019. c 2019 Association for Computational Linguistics.

Zihang Dai, et al., "Transformer-XL: Attentive Language Models Beyond a Fixed-Length Context;" Proceedings of the 57th Annual Meeting of the Association for Computational Linguistics, pp. 2978-2988 Florence, Italy, Jul. 28-Aug. 2, 2019. c 2019 Association for Computational Linguistics.

* cited by examiner

| | | |
|---|---|---|
| Gold | | aim . to investigate incidental adrenal enlargement clinical characteristics and functional status and analyze functional lesion risk factors.<br>materials and methods.<br>this retrospective study included 578 patients with adrenal imaging features showing enlargement.<br>incidental adrenal enlargement cases (78) were considered eligible.<br>demographics, functional diagnosis, adrenal imaging features, and concomitant diseases were analyzed.<br>results.<br>the number of adrenal enlargements and proportion of incidental adrenal enlargement increased each year.<br>mean patient age was 50.32 years.<br>thirty-nine cases had unilateral enlargement on the left side and 3 on the right side; 36 had bilateral enlargement.<br>routine medical checkup was found to have the greatest chance (43.59%) of revealing clinical onsets leading to discovery.<br>biochemical and functional evaluation revealed 54 (69.23%) cases of nonfunctional lesions, 12(15.38%) of subclinical cushing syndrome, 6(7.69%) of primary hyperaldosteronism, 1(1.28%) of metastasis, and 5 (6.41%) of unknown functional status.<br>nodular adrenal enlargement (or, 7.306: 95% ci. 1.72728.667;<br>p=0.006) was a risk factor for functional lesions.<br>age and lesion location were not significant factors.<br>conclusion.<br>incidental adrenal enlargement is a frequent radiographic finding and is accompanied by diverse clinical factors that require proper evaluation and management.<br>nodular adrenal enlargement was a risk factor |
| Summarization Module | 8- | data retrieved included patient demographics, final functional diagnosis, adrenal imaging features, and concomitant diseases. |
| | 14- | smooth enlargement was defined as enlargement of the gland with a smooth contour and no measureable or diffuse nodules, after obtaining patient history and physical examination, all patients underwent biochemical evaluation to assess their functional status. |
| | 16- | patients with an aldosterone-rennin ratio (arr) > 20 underwent any 1 of 3 confirmatory tests (saline infusion, captopril challenge.or postural stimulation) to confirm or exclude definitively primary hyperaldosteronism (pa). |
| | 25- | as shown in table 1, routine medical checkup was found to have the greatest chance (43.59%) of revealing clinical onsets leading to the discovery of adrenal enlargement. |
| | 29- | nodular adrenal enlargement (or 7.306; 95% ci, 1.72728.667; p=0.006) was the risk factor for functional lesions. |
| | 31- | our study shows that the proportion of incidental adrenal enlargement has gradually increased by year. |
| | 46- | acth-independent macronodular hyperplasia (aimah ) and primary pigmented nodular adrenal hyperplasia often manifest as adrenal hyperplasia. the clinical features of aimah tended to be atypical. |
| Other | 4- | it is a common term for a variety of adrenal disorders, but its cause must be property assessed so that patients needing treatment, such as those with hormone hypersecretion or malignant disease, can receive appropriate care. however, there is a lack of literature on functional status and its follow-up to provide comprehensive insight to these findings. |
| | 5- | patients with incidental adrenal enlargement were evaluated in a tertiary referral hospital with endocrinological departments in china. |
| | 7- | this retrospective study included 578 patients with adrenal imaging features showing adrenal enlargement who were hospitalized at the department of endocrinology in pla general hospital (beijing, china) between january 1993 and july 2013. |
| | 29- | nodular adrenal enlargement (or 7.306; 95% ci, 1.72728.667 p=0.006) was the risk factor for functional lesions. |
| | 36- | in addition, smooth enlargement was more common, in 53 (83%) cases, and together these statistics reflect the likelihood that adrenal enlargement will be bilateral, smooth, and found in men. |
| | 37- | however, our study did not show this tendency, likely because the research goals and thus, study populations, differed between the 2 studies. |
| | 38- | 's study aimed to explore prevalence, while the present study aimed to evaluate functional status. |

*FIG. 10*

| | | |
|---|---|---|
| Gold | | background and objective.<br>antimicrobial resistance is now a major challenge to clinicians for treating patients.<br>hence, this short term study was undertaken to detect the incidence of multidrug-resistant (mdr),<br>extensively drug-resistant (xdr).<br>and pandrug-resistant (pdr) bacterial isolates in a tertiary care hospital.<br>material and methods.<br>the clinical samples were cultured and bacterial strains were identified in the department of microbiology.<br>the antibiotic susceptibility profile of different bacterial isolates was studied to detect mdr. xdr, and pdr<br>bacteria.<br>results. the antibiotic susceptibility profile of 1060 bacterial strains was studied.<br>393 (37.1%) bacterial strains were mdr, 146 (13.8%) strains were xdr, and no pdr was isolated.<br>all (100%) gram negative bacterial strains were sensitive to colistin whereas all (100%) gram positive<br>bacterial strains were sensitive to vancomycin.<br>conclusion.<br>close monitoring of mdr, xdr, or even pdr must be done by all clinical microbiology laboratories to<br>implement effective measures to reduce the menace of antimicrobial resistance. |
| Summarization Module | 5- | multidrug resistant (mdr) was defined as acquired nonsusceptibility to at least one agent in three or more antimicrobial categories. extensively drug |
| | 36- | no mdr or xdr strain was isolated from streptococcus sp. all (100%) gram positive cocci were sensitive to vancomycin and linezolid |
| | 38- | e. coli was the commonest isolate 261 (35%), followed by pseudomonas aeruginosa 212 (28.4%). |
| | 40- | out of 200 klebsiella pneumoniae strains isolated, 75 (37.5%) and 25 (12.5%) were detected as mdr and xdr, respectively. out of 42 acinetobacter and other nonfermenter species isolated, 19 (45.2%) and 8 (19%) were mdr and xdr strains, respectively. amongst 250 gnb-mdr strains isolated. |
| | 62- | it has been reported that most frequent mdr pathogens were pseudomonas aeruginosa followed by e. coli |
| | 67- | unless and until multidrug resistant organisms are detected and their incidence is known, the strategies for their control can not be adopted properly in healthcare setup, hence, detection, prevention of transmission of mdros by following infection control practices, antimicrobial surveillance, and stewardship are need of the hour. |
| | 69- | we hereby conclude that early detection and close monitoring of mdr, xdr, or even pdr bacterial strains must be started by all clinical microbiology laboratories to reduce the menace of antimicrobial resistance which is now a global problem |
| Other | 9- | this short term cross-sectional study was conducted in the department of microbiology from 15th of april to 15th of july, 2014. |
| | 10- | the bacterial strains were isolated from different clinical samples and were identified by conventional methods. |
| | 17- | methicillin resistant staphylococcus aureus (mrsa) strains were detected by meca-mediated oxacillin resistance using cefoxitin disk (30 g) on mueller hinton (mh) agar plate inoculated with test strains as per standard disk diffusion recommendations and incubated at 3335c for 1618 hours. |
| | 20- | an increase in diameter of 5 mm with ceftazidime plus clavulanic acid as compared to ceftazidime disk alone was considered positive for esbl detection. |
| | 36- | no mdr or xdr strain was isolated from streptococcus sp. all (100%) gram positive cocci were sensitive to vancomycin and linezolid |
| | 38- | e. coli was the commonest isolate 261 (35%), followed by pseudomonas aeruginosa 212 (28.4%). |
| | 65- | the limitation of this study is that this is a single center study for only three-month period in a tertiary care hospital in central india. to reflect the trend of infections caused by mdr and xdr strains of bacteria in the region, a multicenter study involving all types of healthcare setups for a minimum period of one year |

*FIG. 11*

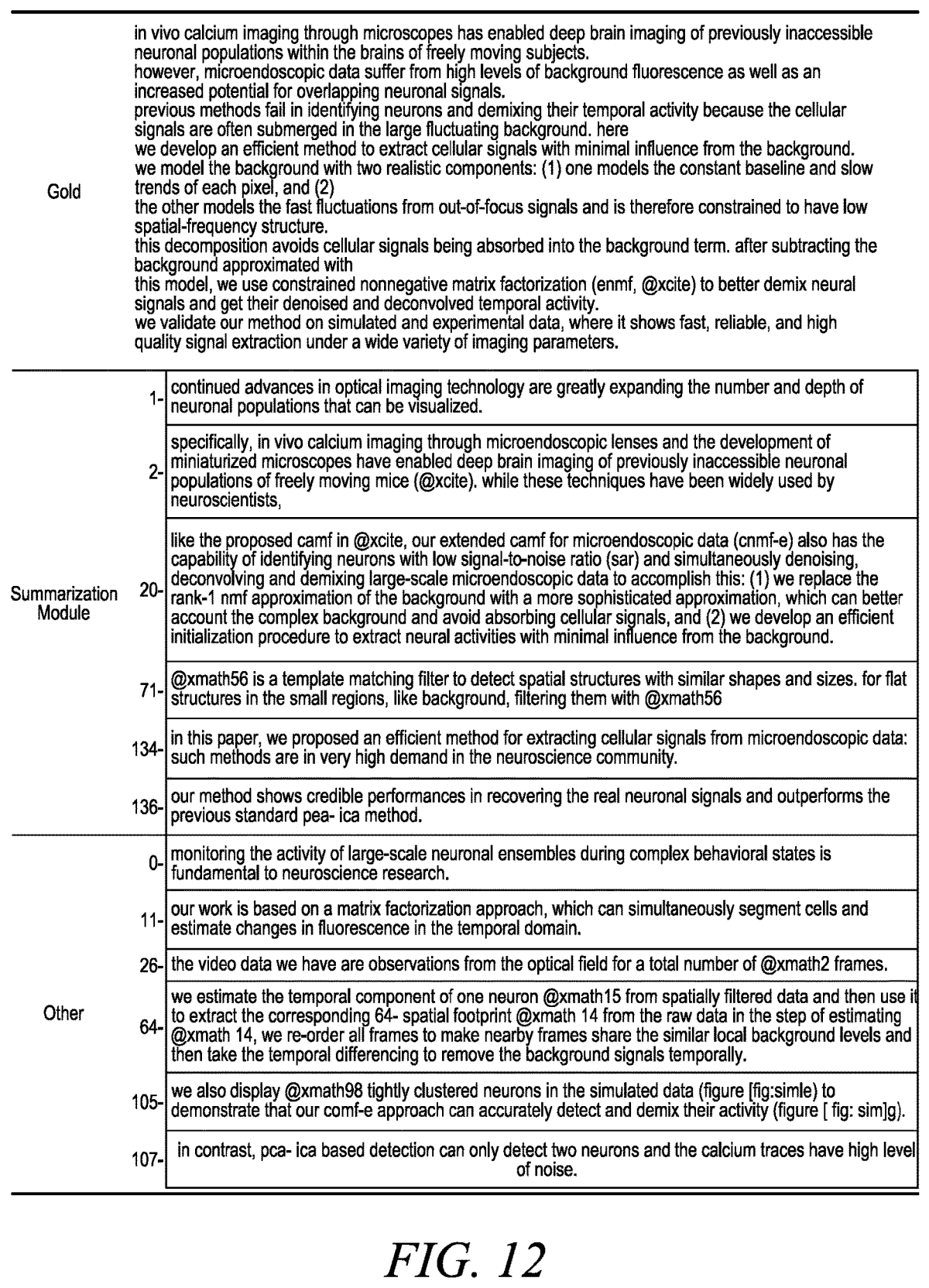

| | | |
|---|---|---|
| Gold | | in vivo calcium imaging through microscopes has enabled deep brain imaging of previously inaccessible neuronal populations within the brains of freely moving subjects.<br>however, microendoscopic data suffer from high levels of background fluorescence as well as an increased potential for overlapping neuronal signals.<br>previous methods fail in identifying neurons and demixing their temporal activity because the cellular signals are often submerged in the large fluctuating background. here<br>we develop an efficient method to extract cellular signals with minimal influence from the background.<br>we model the background with two realistic components: (1) one models the constant baseline and slow trends of each pixel, and (2)<br>the other models the fast fluctuations from out-of-focus signals and is therefore constrained to have low spatial-frequency structure.<br>this decomposition avoids cellular signals being absorbed into the background term. after subtracting the background approximated with<br>this model, we use constrained nonnegative matrix factorization (enmf, @xcite) to better demix neural signals and get their denoised and deconvolved temporal activity.<br>we validate our method on simulated and experimental data, where it shows fast, reliable, and high quality signal extraction under a wide variety of imaging parameters. |
| Summarization Module | 1- | continued advances in optical imaging technology are greatly expanding the number and depth of neuronal populations that can be visualized. |
| | 2- | specifically, in vivo calcium imaging through microendoscopic lenses and the development of miniaturized microscopes have enabled deep brain imaging of previously inaccessible neuronal populations of freely moving mice (@xcite). while these techniques have been widely used by neuroscientists, |
| | 20- | like the proposed camf in @xcite, our extended camf for microendoscopic data (cnmf-e) also has the capability of identifying neurons with low signal-to-noise ratio (sar) and simultaneously denoising, deconvolving and demixing large-scale microendoscopic data to accomplish this: (1) we replace the rank-1 nmf approximation of the background with a more sophisticated approximation, which can better account the complex background and avoid absorbing cellular signals, and (2) we develop an efficient initialization procedure to extract neural activities with minimal influence from the background. |
| | 71- | @xmath56 is a template matching filter to detect spatial structures with similar shapes and sizes. for flat structures in the small regions, like background, filtering them with @xmath56 |
| | 134- | in this paper, we proposed an efficient method for extracting cellular signals from microendoscopic data: such methods are in very high demand in the neuroscience community. |
| | 136- | our method shows credible performances in recovering the real neuronal signals and outperforms the previous standard pea- ica method. |
| Other | 0- | monitoring the activity of large-scale neuronal ensembles during complex behavioral states is fundamental to neuroscience research. |
| | 11- | our work is based on a matrix factorization approach, which can simultaneously segment cells and estimate changes in fluorescence in the temporal domain. |
| | 26- | the video data we have are observations from the optical field for a total number of @xmath2 frames. |
| | 64- | we estimate the temporal component of one neuron @xmath15 from spatially filtered data and then use it to extract the corresponding 64- spatial footprint @xmath 14 from the raw data in the step of estimating @xmath 14, we re-order all frames to make nearby frames share the similar local background levels and then take the temporal differencing to remove the background signals temporally. |
| | 105- | we also display @xmath98 tightly clustered neurons in the simulated data (figure [fig:simle) to demonstrate that our comf-e approach can accurately detect and demix their activity (figure [ fig: sim]g). |
| | 107- | in contrast, pca- ica based detection can only detect two neurons and the calcium traces have high level of noise. |

*FIG. 12*

MODEL GLOBALIZATION FOR LONG DOCUMENT SUMMARIZATION

FIELD

The present disclosure relates to information retrieval systems and methods and more particularly to neural network systems and methods involving transformer models for summarizing long sequences of input text.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, etc.

SUMMARY

In a feature, a summarization system includes: K embedding modules configured to: receive K blocks of text, respectively, of a document to be summarized; and generate K first representations based on the K blocks of text, respectively, where K is an integer greater than 2; a first propagation module configured to generate second representations based on the K first representations; a second propagation module configured to generate third representations based on the second representations; an output module configured to select ones of the K blocks based on the third representations; and a summary module configured to generate a summary of the document from text of the selected ones of the K blocks.

In further features, the document to be summarized includes at least 1024 tokens.

In further features, the output module is configured to: based on the third representations, classify each of the K blocks as being either a first state or a second state; and select the ones of the K blocks based on the classifications.

In further features, the output module includes a feed forward neural network module and a softmax function configured to classify each of the K blocks.

In further features, the first propagation module includes: K transformer modules having a transformer architecture and configured to receive the K first representations and to generate fourth representations based on the K first representations; a recurrent neural network module configured to receive K first ones of the fourth representations and to generate K fifth representations based on the K first ones of the fourth representations; and K feed forward neural network modules configured to generate K sixth representations based on the K fifth representations, respectively, where the second representations include (a) second ones of the fourth representations and (b) the K sixth representations.

In further features, the recurrent neural network module is a bidirectional gate recurrent unit module.

In further features, the fourth representations are a group consisting of (a) the first K ones of the fourth representations and (b) the second ones of the fourth representations.

In further features, the second propagation module includes: K second transformer modules having the transformer architecture and configured to receive the second representations and to generate seventh representations based on the sixth representations; a second recurrent neural network module configured to receive K first ones of the seventh representations and to generate K eighth representations based on the K first ones of the seventh representations; and K second feed forward neural network modules configured to generate K ninth representations based on the K eighth representations, respectively, where the third representations include (a) second ones of the seventh representations and (b) the K eighth representations.

In further features, the K first ones of the fourth representations are K representations of classification (CLS) tokens of the K blocks, respectively.

In further features, the K first representations each include a token embedding, a segment embedding, and a positional encoding, the positional encoding representing a position of the token in its one of the K blocks.

In further features, a third propagation module is configured to generate fourth representations based on the third representations, where the output module is configured to select the ones of the K blocks based on the fourth representations.

In further features, the summary module is configured to store the summary in memory in association with the document.

In further features, the summary module is configured to transmit the summary to a computing device via a network.

In further features, the K blocks each include at least one sentence of text from the document.

In further features, each of the first and second propagation modules includes (a) K transformer modules configured to independently determine dependencies locally within the K blocks of text and (b) a bi-directional recurrent neural network module configured to process output of the K transformer modules and to determine dependencies globally within the document.

In further features, a query system includes: a search module configured to receive a query as input and obtain search results based on the query; and the summarization system, where the summarization module is configured to produce summaries of the search results for the search module, and the search module is further configured to output the search results and the summaries of the search results produced by the summarization module.

In a feature, a summarization system includes: K means for: receiving K blocks of text, respectively, of a document to be summarized; and generating K first representations based on the K blocks of text, respectively, where K is an integer greater than 2; a means for generating second representations based on the K first representations; a means for generating third representations based on the second representations; a means for selecting ones of the K blocks based on the third representations; and a means for generating a summary of the document from text of the selected ones of the K blocks.

In a feature, a summarization method includes: receiving K blocks of text, respectively, of a document to be summarized; generating K first representations based on the K blocks of text, respectively, where K is an integer greater than 2; generating second representations based on the K first representations; generating third representations based on the second representations; selecting ones of the K blocks based on the third representations; and generating a summary of the document from text of the selected ones of the K blocks.

In further features, selecting ones of the K blocks includes: based on the third representations, classifying each of the K blocks as being either a first state or a second state; and selecting the ones of the K blocks based on the classifications.

In further features, the K first representations each include a token embedding, a segment embedding, and a positional encoding, the positional encoding representing a position of the token in its one of the K blocks.

In further features, the summarization method further includes generating fourth representations based on the third representations, where selecting ones of the K blocks includes selecting the ones of the K blocks based on the fourth representations.

In further features, the K blocks each include at least one sentence of text from the document.

In further features, a method includes: receiving a query as input; obtaining search results based on the query; and performing the summarization method to produce summaries of the search results; and outputting the search results and the summaries of the search results.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 10-12 are illustrations of example summaries generated by the summation module and in other manners.

In the drawings, reference numbers may be reused to identify similar and/or identical elements.

DETAILED DESCRIPTION

Fine tuning a large neural network language model on downstream tasks may be used in natural language processing. Natural language processing using neural network transformer based architectures, however, may have limitations when the task involves long documents (long sequences of input text).

Transformer architecture as used herein is described in Ashish Vaswani, Noam Shazeer, Niki Parmar, Jakob Uszkoreit, Llion Jones, Aidan N Gomez, Ł ukasz Kaiser, and Illia Polosukhin, "Attention is all you need", In I. Guyon, U. V. Luxburg, S. Bengio, H. Wallach, R. Fergus, S. Vishwanathan, and R. Garnett, editors, Advances in Neural Information Processing Systems 30, pages 5998-6008, Curran Associates, Inc., 2017, which is incorporated herein in its entirety. Additional information regarding the transformer architecture is provided below.

More generally attention mechanisms in the transformer architecture allow for the amplification of relevant signals in a neural network, similar to the way a human is able to intuitively focus on certain parts of an image and know what is important. Self-attention mechanisms are attention mechanisms that relate different positions of a sequence (e.g., determining correlation of words in a sentence). Transformers are one way to implement a self-attention mechanism that maps queries against a set of keys to present values, which together define an embedding matrix.

Transformer self-attention memory quadratically increases with the number of input tokens, so it may at some point be computationally impossible to compute on document sequences above a certain scale.

One solution to overcome this limitation includes pre-training the neural network model using longer sequences. This solution, however, will involve a large computational power consumption and take a long period.

The present application, which presents a solution to overcome the limitations, involves a summarization module including hierarchical propagation modules that spread information between multiple transformer windows. The hierarchical approach includes dividing a long document into multiple blocks and independently processing the blocks using the scaled dot attentions of the transformer layers and combining the results of successive layers.

Figure 1:
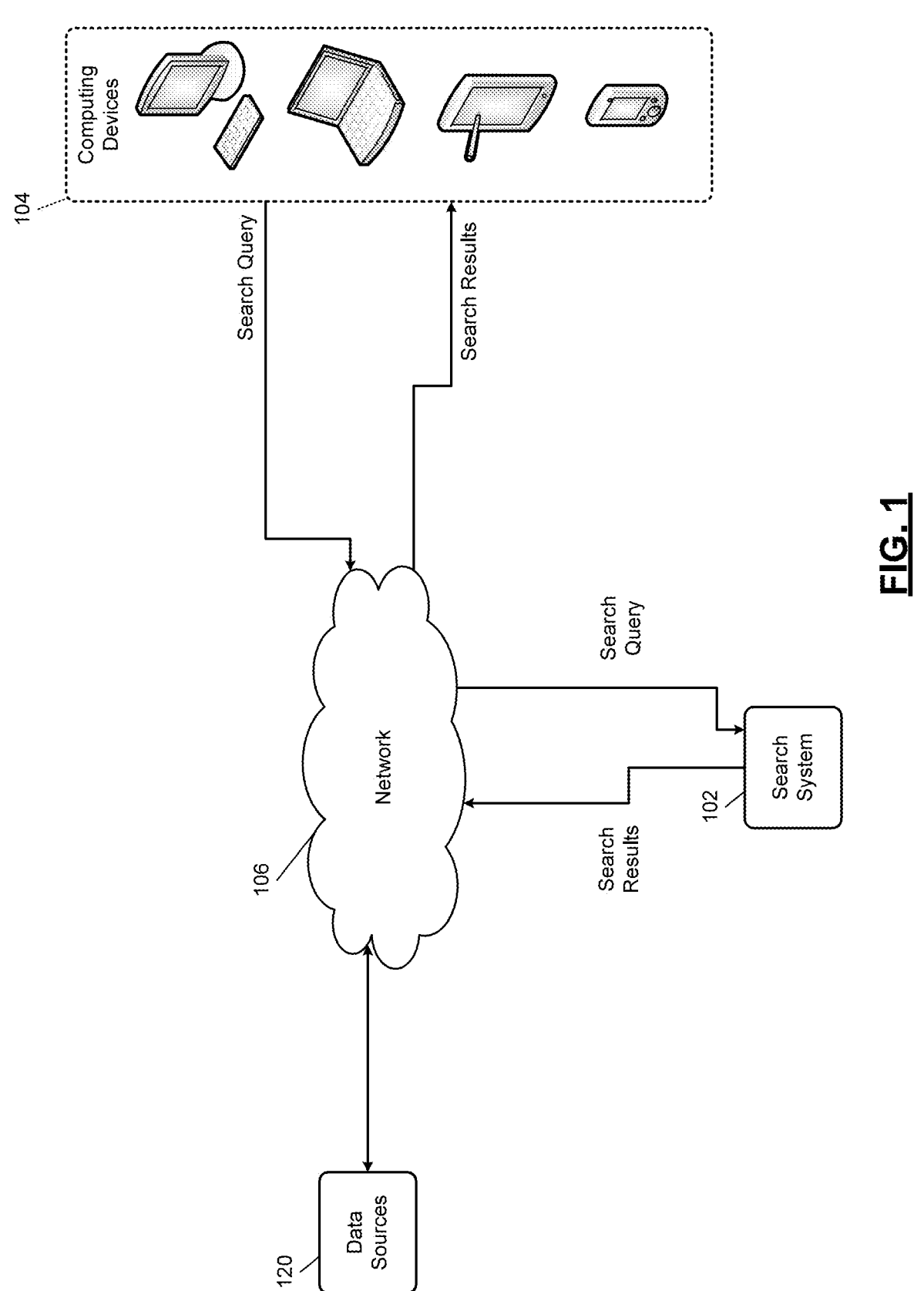
FIG. 1 includes a functional block diagram of an example environment including a search system configured to provide search results in response to queries.

FIG. 1 includes a functional block diagram including a search system 102 configured to respond to queries with search results. The search system 102 is configured to receive queries from one or more computing device(s) 104 via a network 106. The search system 102 performs searches based on the queries, respectively, to identify one or more search results for the queries. The search system 102 is also configured to provide summaries regarding the search results, respectively. The search system 102 transmits the search results and the summaries back to the computing devices 104 that transmitted the queries, respectively. For example, the summaries may be summaries of reviews of products or summaries of other long documents (e.g., dialogs, chat sessions, etc.).

While the example of information retrieval is provided, the concepts described herein regarding long document summarization are also applicable to other environments. For example, the present application is also applicable to named entity recognition, topic classification, sequence tagging, and other environments where summarization of long documents may be helpful.

The computing devices 104 may output (e.g., display) the search results and the summaries to users. The computing devices 104 may also display other information to the users. For example, the computing devices 104 may display additional information related to the search results, advertisements related to the search results, and/or other information.

In various implementations, the computing devices 104 may audibly output the search results and the other information via one or more speakers. The search system 102 and the computing devices 104 communicate via a network 106.

A plurality of different types of computing devices 104 are illustrated in FIG. 1. The computing devices 104 include any type of computing devices that is configured to generate and transmit search queries to the search system 102 via the network 106. Examples of the computing devices 104 include, but are not limited to, smart (cellular) phones, tablet computers, laptop computers, and desktop computers, as illustrated in FIG. 1. The computing devices 104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.). In various implementations, the search system 102 may be implemented within a device, such as a navigating robot or a vehicle.

The computing devices 104 may use a variety of different operating systems. In an example where a computing device 104 is a mobile device, the computing device 104 may run an operating system including, but not limited to, Android, iOS developed by Apple Inc., or Windows Phone developed by Microsoft Corporation. In an example where a computing device 104 is a laptop or desktop device, the computing device 104 may run an operating system including, but not limited to, Microsoft Windows, Mac OS, or Linux. The computing devices 104 may also access the search system 102 while running operating systems other than those operating systems described above, whether presently available or developed in the future.

In some examples, a computing device 104 may communicate with the search system 102 using an application installed on the computing device 104. In general, a computing device 104 may communicate with the search system 102 using an application that can transmit queries to the search system 102 to be responded to (with search results) by the search system 102. In some examples, a computing device 104 may run an application that is dedicated to interfacing with the search system 102. In some examples, a computing device 104 may communicate with the search system 102 using a more general application, such as a web-browser application. The application executed by a computing device 104 to communicate with the search system 102 may display a search field on a graphical user interface (GUI) in which the user may input search queries. The user may input a search query, for example, by adding text to a text field using a touchscreen or physical keyboard, a speech-to-text program, or other form of user input. The user may input a search query, for example, by uploading an image stored in memory of the computing device 104.

A text query entered into a GUI on a computing device 104 may include words, numbers, letters, punctuation marks, and/or symbols. In general, a query may be a request for information identification and retrieval from the search system 102.

A computing device 104 may receive a search result from the search system 102 that is responsive to the search query transmitted to the search system 102. In various implementations, the computing device 104 may receive and the search system 102 may transmit multiple search results that are responsive to the search query. In the example of the search system 102 providing multiple search results, the search system 102 may determine a confidence value (indicative of a likelihood of a search result is the most relevant search result to the search query) for each of the search results and provide the confidence values along with the search results to the computing device 104. The computing device 104 may display more than one of the multiple search results (e.g., all search results having a confidence value that is greater than a predetermined value), only the search result with the highest confidence value, the search results having the k highest confidence values (where k is an integer greater than one), etc.

The computing device 104 may be running (executing) an application including a GUI that displays the search result(s) received from the search system 102. The respective confidence value(s) may also be displayed. For example, the application used to transmit the search query to the search system 102 may also present (e.g., display or speak) the received search results(s) to the user via the computing device 104. As described above, the application that presents the received search result(s) to the user may be dedicated to interfacing with the search system 102 in some examples. In other examples, the application may be a more general application, such as a web-browser application.

The GUI of the application running on the computing device 104 may display or output the search result(s) to the user in a variety of different ways, depending on what information is transmitted to the computing device 104. In examples where the search results include a list of search results and associated confidence values, the search system 102 may transmit the list of search results and respective confidence values to the computing device 104. In this example, the GUI may display or output the search result(s) and the confidence value(s) to the user as a list of possible search results. The GUI may also output the summaries for the search results to the user.

In some examples, the search system 102, or other computing system, may transmit additional information to the computing device 104 such as, but not limited to, applications and/or other information associated with the search results, the search query, or points of interest associated with the search results, etc. This additional information may be stored in a data store and transmitted by the search system 102 to the computing device 104 in some examples. In examples where the computing device 104 receives the additional information, the GUI may display the additional information along with the search result(s). In some examples, the GUI may display the search results as a list ordered from the top of the screen to the bottom of the screen by descending confidence value. In some examples, the search results may be displayed under the search field in which the user entered the search query.

In some examples, computing devices 104 may communicate with the search system 102 via a partner computing system. The partner computing system may include a computing system of a third party that may leverage the search functionality of the search system 102. The partner computing system may belong to a company or organization other than that which operates the search system 102. Example third parties which may leverage the functionality of the search system 102 may include, but are not limited to, internet search providers and wireless communications service providers. The computing devices 104 may send search queries to the search system 102 via the partner computing system. The computing devices 104 may also receive search results from the search system 102 via the partner computing system. The partner computing system may provide a user interface to the computing devices 104 in some examples and/or modify the user experience provided on the computing devices 104.

Data regarding search results from which the search system 102 determines the search results for queries may be stored in one or more data sources 120. The data sources 120 may include a variety of different data providers. The data sources 120 may include digital distribution platforms such as, but are not limited to, online news sources, websites, social networking sites (e.g., Facebook, Twitter, etc.), databases, and/or other types of data sources.

The data sources 120 may include, for example, a plurality of images and associated captions, respectively. In other words, each image includes an associated caption. The images and the captions are stored in memory of one or more of the data sources 120. While the example of the data sources 120 including images and captions is provided, the data sources 120 may include other data and/or other types of data.

The computing devices 104, the search system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

The present application involves a summarization module that generates summaries of long documents (e.g., having at least 1024 tokens). The summarization module includes a hierarchical structure that uses transformer modules to encode local text blocks that are used to compute document level representations. Recurrent hierarchical modules are also included between different transformer modules and not only on top of the hierarchical structure/modules. Because the summarization module constructs and propagates document level information between the layers, global and local information of the document are fused at multiple (e.g., every) level of the architecture.

Figure 2:
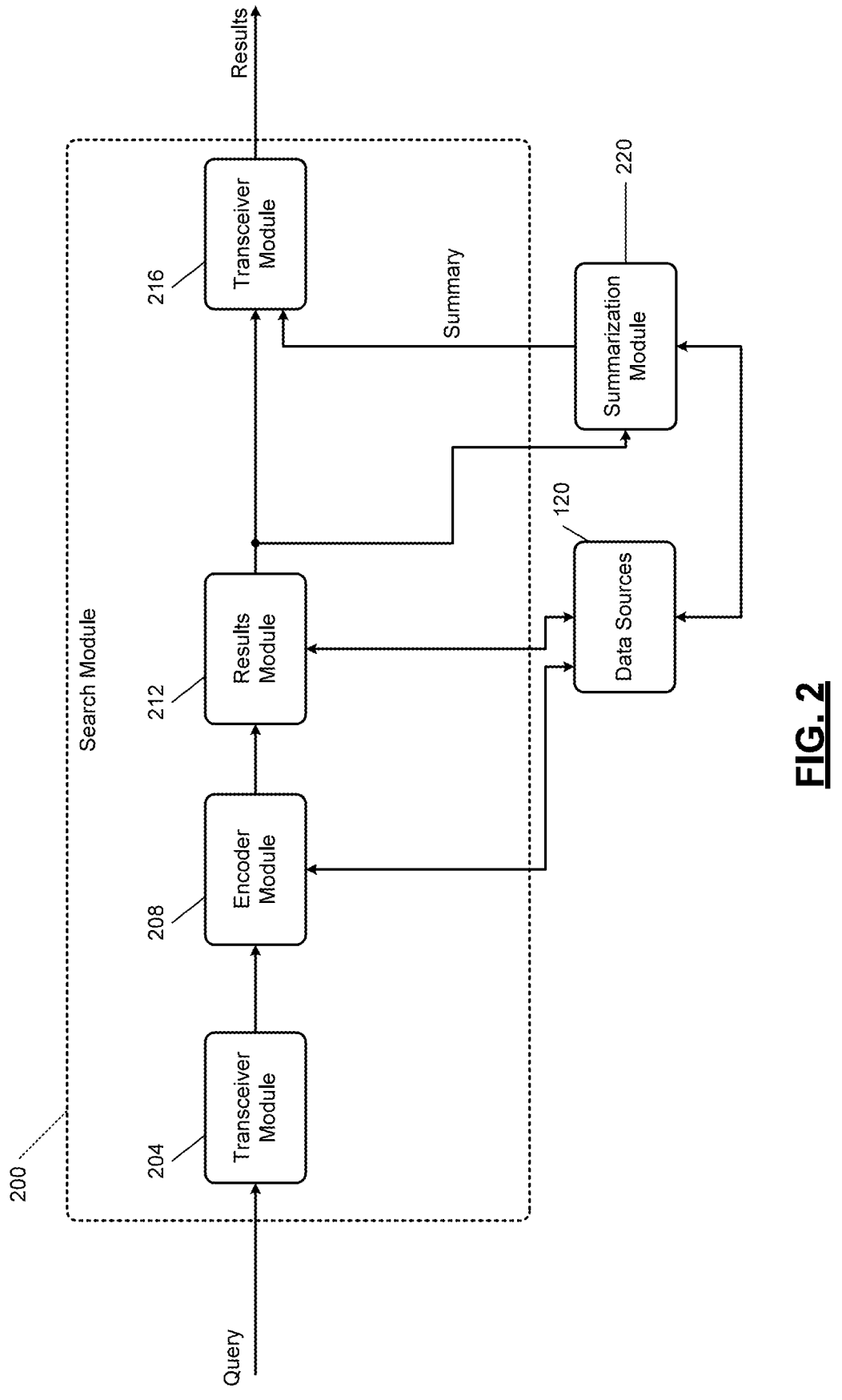
FIG. 2 includes a functional block diagram including an example implementation of a search module of the search system.

FIG. 2 is a functional block diagram including an example implementation of a search module 200 of the search system 102. A first transceiver module 204 receives a search query from a computing device 104.

An encoder module 208 encodes/embeds the search query using an embedding function. The encoder module 208 also encodes/embeds candidate search results from the data sources 120 using the embedding function. The encoder module 208 may include a neural network that performs the embedding/encoding, such as a convolutional neural network (CNN) or another suitable type of neural network. As an example, the neural network may be the ResNet-18 neural network or another suitable type of neural network.

A results module 212 determines the top k search results from the data sources 120 that most closely match the search query, where k is an integer greater than zero. The search results may be, for example, products, points of interest, restaurants, businesses, etc. In various implementations, the data sources 120 may be stored within the search module 200 or within the same device as the search module 200.

A second transceiver module 216 transmits the determined search results for the search query back to the computing device 104 via the network 106. In various implementations, the second transceiver module 216 may be omitted, and the first transceiver module 204 may transmit the search results back to the computing device 104 from which the search query was received.

A summarization module 220 (e.g., of the search system 102) generates summaries of long documents associated with search results, respectively. For example, the summarization module 220 may generate summaries of text reviews stored and associated with the search results, respectively. In the example of multiple (e.g., many) text reviews being present for one search result, the multiple text reviews may be combined into one long review and summarized by the summarization module 220. Summaries regarding the search results may also be transmitted with the search results to the computing device 104 from which the query was received. The summaries may be output to users via the computing device 104, such as displayed on a display and/or output via one or more speakers.

The summarization module 220 may be implemented separately from the search module 200 as shown or may be implemented within the search module 200. The search module 200 may determine the summaries for the k search results in response to receiving a query or determine summaries for possible search results continuously and update summaries as documents (e.g., reviews) are added/stored.

In various implementations, the summarization module 220 may be used to provide a summary of an input long document. For example, a computing device may transmit a long document (e.g., text or a document file) to the summarization module 220 via a network for summarization. The summarization module 220 may determine the summary of the long document and transmit the summary of the document to the computing device from which the long document was received. In various implementations, speech may be input and the long document may be obtained via speech-to-text conversion from the speech.

Figure 3:
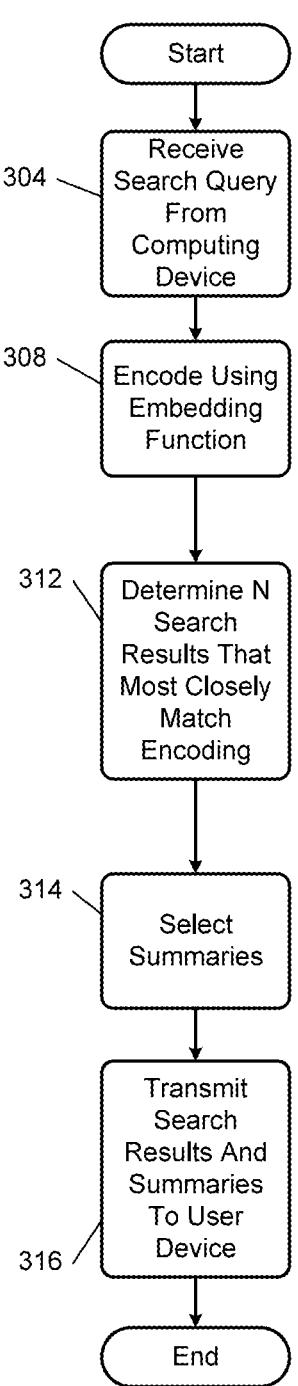
FIG. 3 includes a flowchart depicting an example method of receiving a query and providing a response to the query.

FIG. 3 includes a flowchart depicting an example method of receiving a search query and providing search results. The example of FIG. 3 may be performed by the search module 200 and the summarization module 220.

Control begins with 304 where the search module 200 receives a search query, such as from a computing device 104. The search query may include, for example, text, an image, or sound.

At 308, the search module 200 encodes the search query using the embedding function 314. At 312, the search module 200 determines the k search results that most closely match the search query.

At 314, the summarization module 300 determines the summaries for the k search results, respectively. At 316, the search module 300 transmits the search results and the summaries, respectively, to the computing device 104 that transmitted the search query. The search results may include, for example, k images, k links (e.g., hyperlinks), the summaries, and/or other suitable information.

Figure 4:
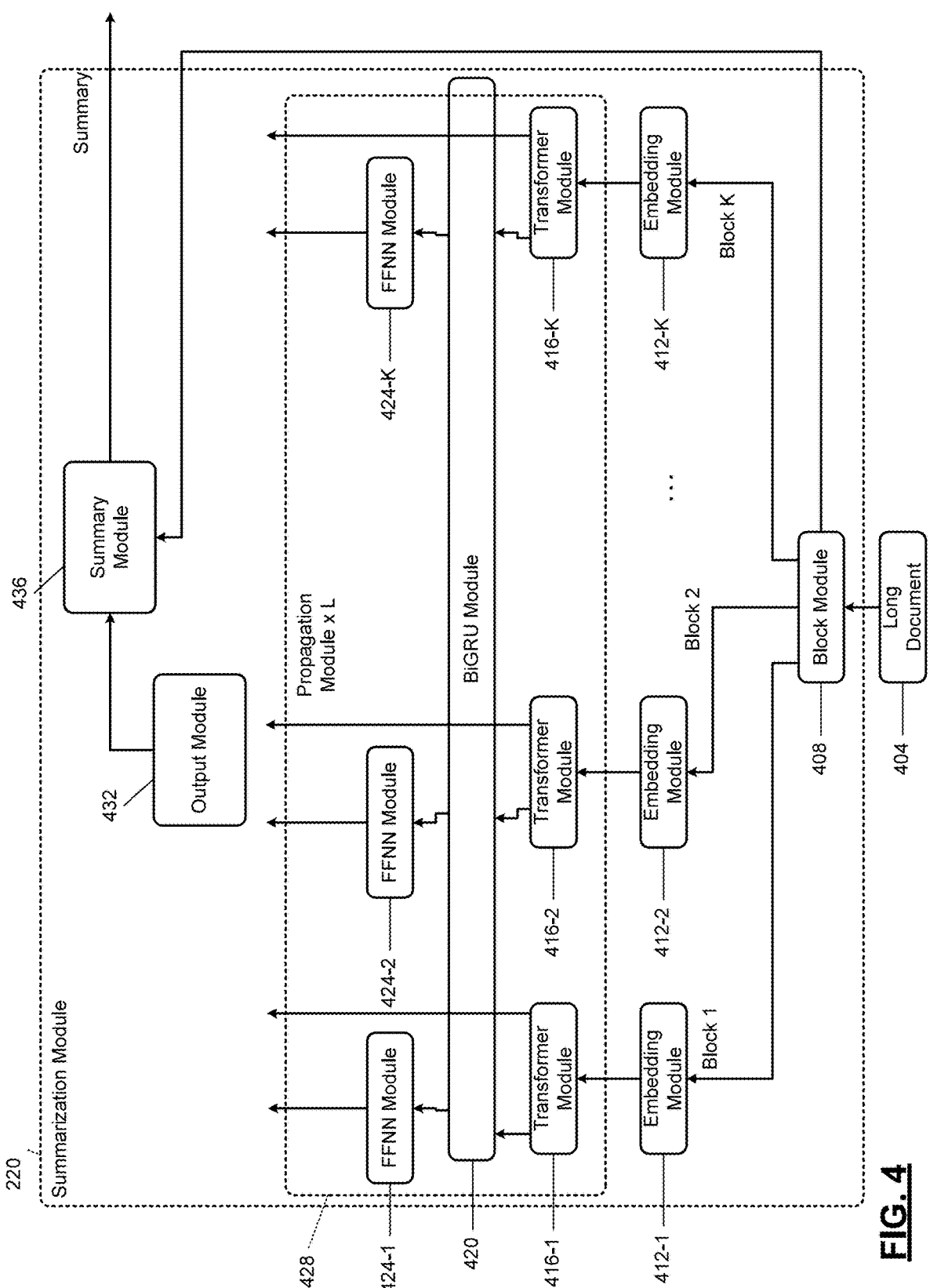
FIGS. 4 and 5 include functional block diagrams of an example implementation of a summarization module.
Figure 5:
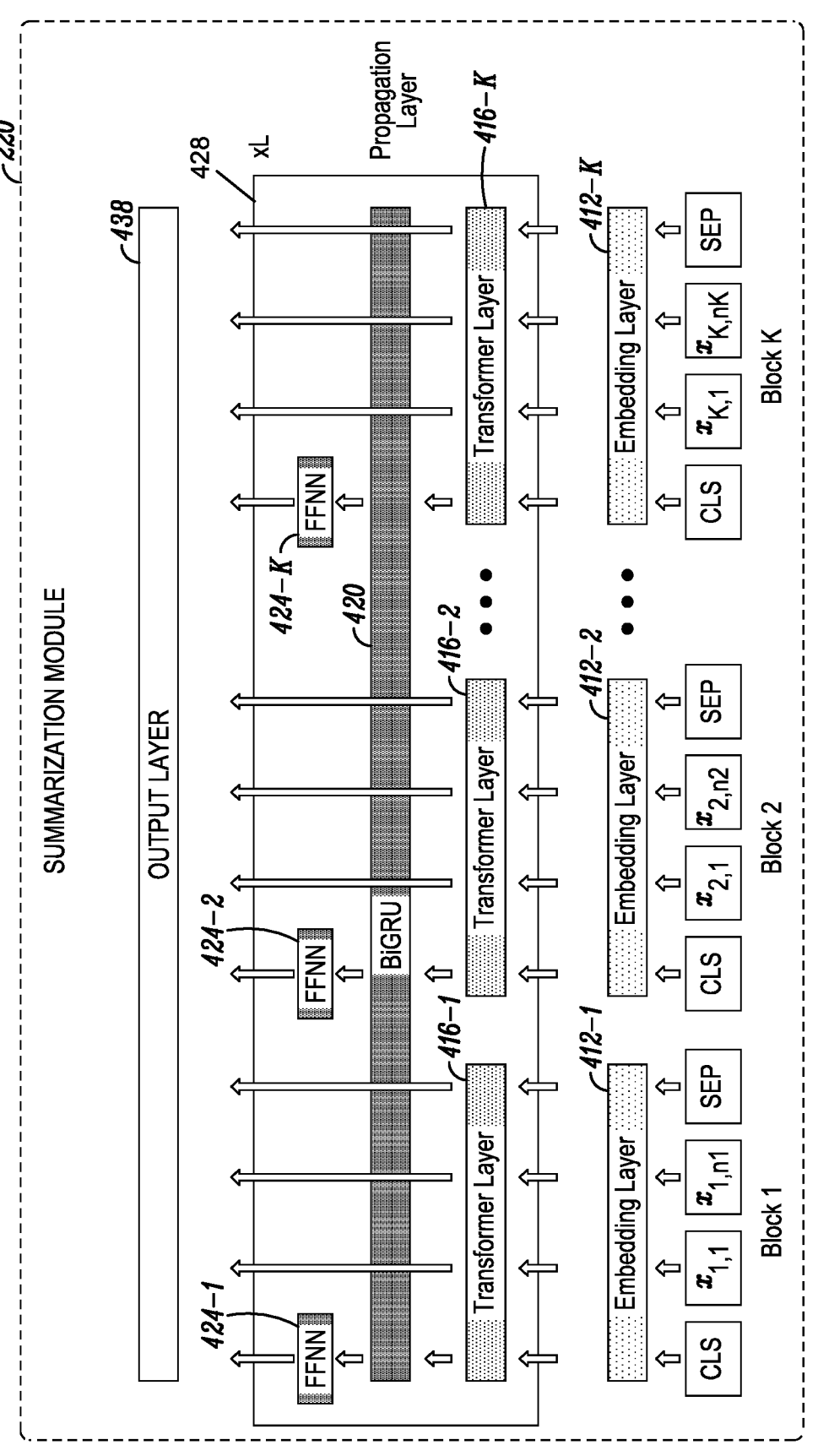

FIGS. 4 and 5 include functional block diagrams of an example implementation of the summarization module 220. An example of one long document 404 is illustrated in the example of FIG. 4, but the present application is also applicable to other long documents. Long documents may include at least 1024 tokens. Tokens may be identified in the long document 404 using a tokenizer, which splits the long document 404 into a vocabulary of smaller units (i.e., tokens). These units could be words or short parts of words from which other words can be composed.

A block module 408 divides the long document 404 into K blocks, where K is an integer greater than 2. The blocks may be sentences, paragraphs, or other sections, respectively, of the long document 404. The blocks may be the same size (e.g., same number of sentences, paragraphs, etc.) or different sizes.

Let D be a document including K blocks, D={B₁, B₂, . . . , B_K}, where each block B_k=, 1≤k≤K includes n_k tokens. The block module 408 adds predetermined tokens, such as a classification (CLS) token to the front of each block and a SEP token to the end of each block so that B_k={[CLS]; x_{k,1}; x_{k,2}; . . . x_{k,n_k}; [SEP]}, where x_{k,i} is the index of the WordPiece token I of block k. The WordPiece subword segmentation algorithm or another suitable subword segmentation algorithm may be used for tokenization. Index 0 (with respect to n_k+1) may be used to refer to the representation of the [CLS] (resp. [SEP]) token of each block. The block module 408 may also tokenize the blocks of text.

K embedding modules 412-1, 412-2, 412-K ("embedding modules 412") embed each token of the K blocks, respectively. The embedding modules 412 project each token of each block into a dense representation of that token. Each embedding token representation (e.g., a vector or matrix) may include a token embedding, a segment embedding, and a positional encoding that represents the position of the token in its block. The embedding of a block k can be denoted by E_k(E_k∈ ℝ^{n_k+2)xh}, 1≤k≤K).

The embedding token representations are input to transformer modules 416-1, 416-2, 416-K ("transformer modules 416") having the transformer architecture.

The transformer modules 416 generates transformed token representations (e.g., vectors or matrices) based on the embedding token representations, respectively, of each block. The transformed token representations of the CLS tokens (transformed CLS representations) of the blocks are input to a bidirectional gate recurrent unit (BiGRU) module 420 or another suitable type of recurrent bidirectional neural network (RNN), such as a bidirectional long short-term memory (BiLSTM) model. The transformed CLS representations and the transformed token representations of each other token of each other block bypass the BiGRU module 420 and are output.

The BiGRU module 420 generates K propagated representations (e.g., vectors or matrices) for the K blocks, respectively, based on the transformed CLS representations collectively. The BiGRU module 420 propagates local information from each of the blocks to each of the other blocks to generate the propagated representations and spread global information across the blocks. For example, the BiGRU module 420 may generate the propagated representation for the first block (K=1) based on the transformed CLS representation of the first block and the transformed CLS representation of one or more of the other K blocks.

K feed forward neural network (FFNN) modules 424-1, 424-2, . . . , 424-K ("FFNN modules 412") generate feed forward representations (e.g., vectors or matrices) based on the propagated representations, respectively.

The summarization module 220 includes L (hierarchical) propagation modules 428, where L is an integer greater than or equal to 1. The L propagation modules 428 may be identical and each include transformer modules 416, the BiGRU module 420, and the FFNN modules 424. The representations output by the FFNN modules 424 and the transformer modules 416 of the last (L-th) one of the propagation modules 428 are output to an output module 432. The representations output by the FFNN modules 424 and the transformer modules 416 of the 1ˢᵗ through L-1th propagation modules 428 are output to a next one of the propagation modules 428. For example, the representations output by the FFNN modules 424 and the transformer modules 416 of the first one of the propagation modules 428 are output to the second one of the propagation modules 428, etc. The L propagation modules 428 update the CLS representations of each block based on the CLS representations of the blocks, respectively, and of one or more of the other blocks. The L propagation modules 428 process the other representations (e.g., tokens, SEP) respectively per block.

For any of the propagation modules ℓ, 1≤ℓ≤L, let U_k^ℓ∈ ℝ^{(n_k+2)xh} be the representation of block k after the (ℓ−1th) propagation module, the representation for the first layer being initialized with the output of the embedding layer:

$$U_1^k = E_k, \forall k \in$$

The pre-trained transformer modules 416 apply the transformer functions T^ℓ individually on each block of the long document 404 to compute local token-aware representations V_k^ℓ ∈ ℝ^{(n_k+2)xh}:

$$V_k^ℓ = T^ℓ U_k^ℓ, \forall k \in \{1, \ldots, K\}$$

The BiGRU module 420 of one of the propagation modules 428 ℓ propagates information across all of the blocks of the long document to generate a global block-aware representation for the long document 404 at that module/layer ℓ denoted by W^ℓ∈ ℝ^{Kxh}. This is done for each BiGRU module 420 of the L propagation modules 428. To do this, each BiGRU module 420 receives the representation vectors of the different blocks from the respective transformer modules 416 of that layer ℓ. The FFNN modules 424 may be used to preserve the hidden dimension of the transformer modules 416.

Each block k is represented by its [CLS] vector, the vector represented by V_{k,0}^ℓ ∈ ℝ^h at the first position in the local representation of the block. The representations are concatenated by the transformer modules 416 to form the input to the BiGRU module 420. The global, block-aware representation is computed by the FFNN modules 424 by applying the FFNN to the K outputs of the BiGRU:

$$W_k^ℓ = \text{FFN}(\text{BiGRU}_k([V_{1,0}^ℓ; \ldots; V_{K,0}^ℓ]),$$

where BiGRU_k denotes the kth output of the BiGRU module 420 and; is the concatenation operation.

At this point, for a given document, local block representations V_k^ℓ (1≤k≤K) and global representation W^ℓ have been computed. These are combined to build the output representation of the propagation module/layer $\ell$:

$$U_k^{\ell+1} = [W_k^{\ell}; V_{k,1}^{\ell}; \ldots; V_{k,n_k+1}^{\ell}], \ 1 \leq k \leq K.$$

$U_k^{\ell+1} \in \mathbb{R}^{(n_k+2) \times h}$ is a representation of block k in which the [CLS] vector representation is enriched with document level information propagated from other blocks. $U_k^{\ell+1}$ is the input to the next one of the propagation modules/layers 428.

An output module 432 receives the output of the last one (L-th one) of the L propagation modules/layers 428. The output module 432 determines which ones of the sentences (or blocks) includes the most relevant information for the summary. For example, the output module 432 may perform binary classification and label each block as either (a) relevant to the summary or (b) not relevant to the summary. For example, the output module 432 may apply a feed forward neural network (FFNN) or another suitable type of recurrent neural network and apply a softmax function on the output of the FFNN on the top of the block level representations of the last one of the propagation modules/layers 428 L to produce $Y \in \mathbb{R}^{Kx}$, t,?

Using the recurrent neural network to propagate information between blocks allows the summarization module 220 to scale to long sequences of blocks without using an attention mechanism that would not scale. Also, using the recurrent neural network does not require that any positional encoding be used on block representations.

A summary module 436 receives the sentences or blocks identified by the output module 432 as being relevant and concatenates the sentences or blocks to produce the summary for the long document 404. The summary module 436 may store the summary in memory in association with the long document 404, transmit the summary to a computing device via a network, and/or take one or more other actions. In FIGS. 4 and 5, the output module 432 and the summary module 436 shown in FIG. 4 are shown together in FIG. 5 as output layer 438.

Advantageously as shown in FIG. 5, the hierarchical approach does not limit the potential scope of the transformer attention mechanism. In each propagation layer 428, the model applies independent transformer layers 416 on K blocks of a long document and interleaves the independent transformer layers 416 with a BiGRU layers 420 to provide context between the transformer layers 416, which allows the model to capture inter-block dependencies (i.e., the K blocks as a whole) immediately after intra-block dependencies are determined independently by each local attention layer 416.

Figure 6:
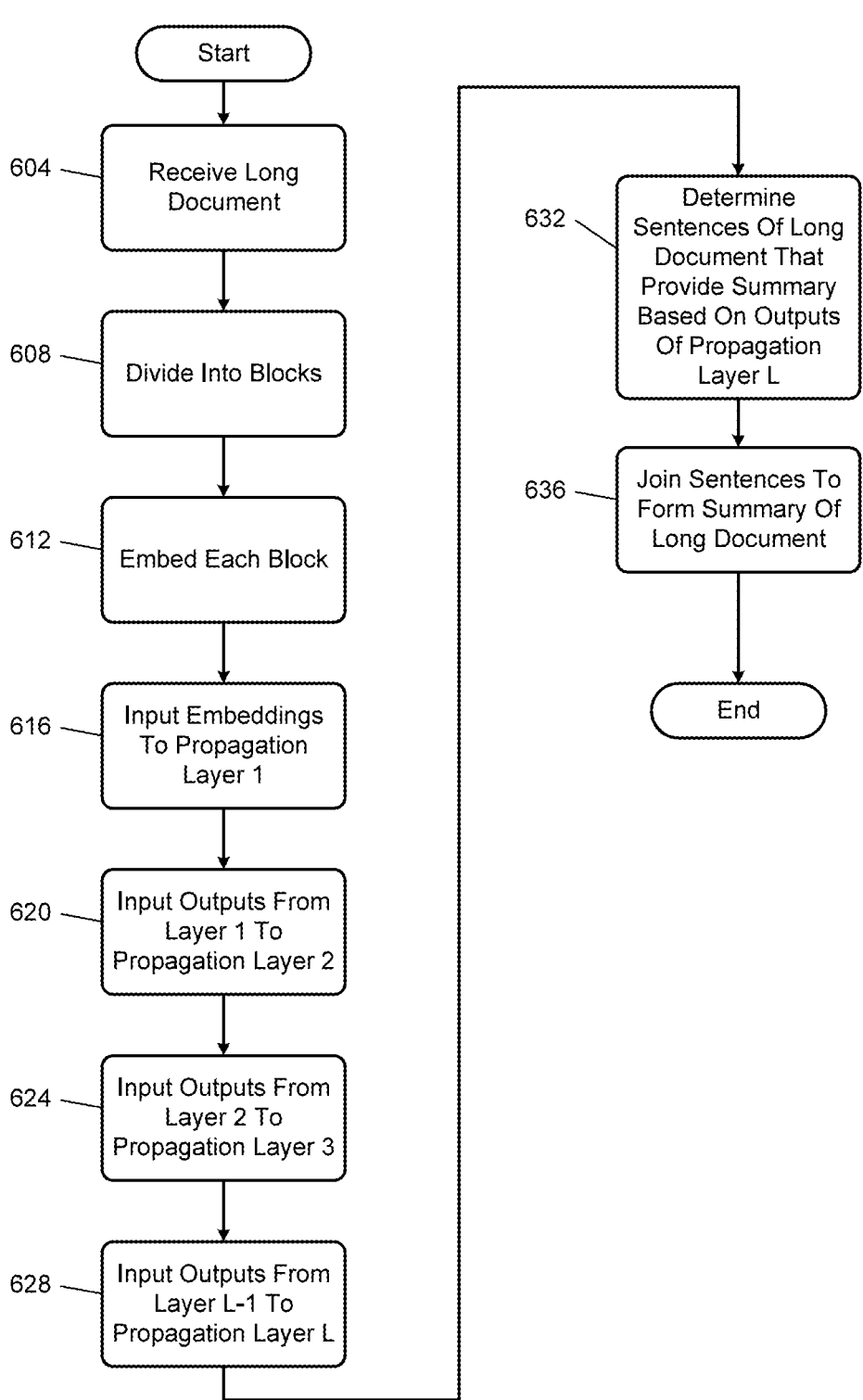
FIG. 6 is a flowchart depicting an example method of generating a summary of a long document.

FIG. 6 is a flowchart depicting an example method of generating a summary of a long document. Control begins with 604 where the summarization module 220 receives a long document to be summarized.

At 608, the block module 408 divides the long document into blocks of text, such as K blocks of text. The CLS and SEP tokens are also added. At 612, the embedding modules 412 embed the blocks of text, respectively. At 616, the embeddings from the embedding modules 412 are input to the first propagation module 428. The first propagation module 428 determines the global and block specific representations as discussed above based on input embeddings as discussed above.

At 620, the second propagation module 428 receives the global and block specific representations from the first propagation module 428 and determines second global and block specific representations based on the output of the first propagation module 428. At 624, the third propagation module 428 receives the global and block specific representations from the second propagation module 428 and determines third global and block specific representations based on the output of the second propagation module 428. At 628, the last (L-th) propagation module 428 receives the global and block specific representations from the L–1th propagation module 428 and determines L-th global and block specific representations based on the output of the L–1th propagation module 428.

At 632, the output module 432 determines the sentences or blocks of the long document (e.g., the top m sentences or blocks) that are most relevant to summarizing the long document as discussed above. At 636, the summary module 436 joins (e.g., concatenates) the sentences or blocks of text to form the summary of the long document. The summarization module 220 may store the summary for the document, transmit the summary to a computing device, and/or perform one or more actions. While control is shown as ending, control may return to 604. Also, while the example of at least 4 propagation modules/layers is illustrated in FIG. 6, the present application is applicable to 2 or more propagation modules/layers.

Figure 7:
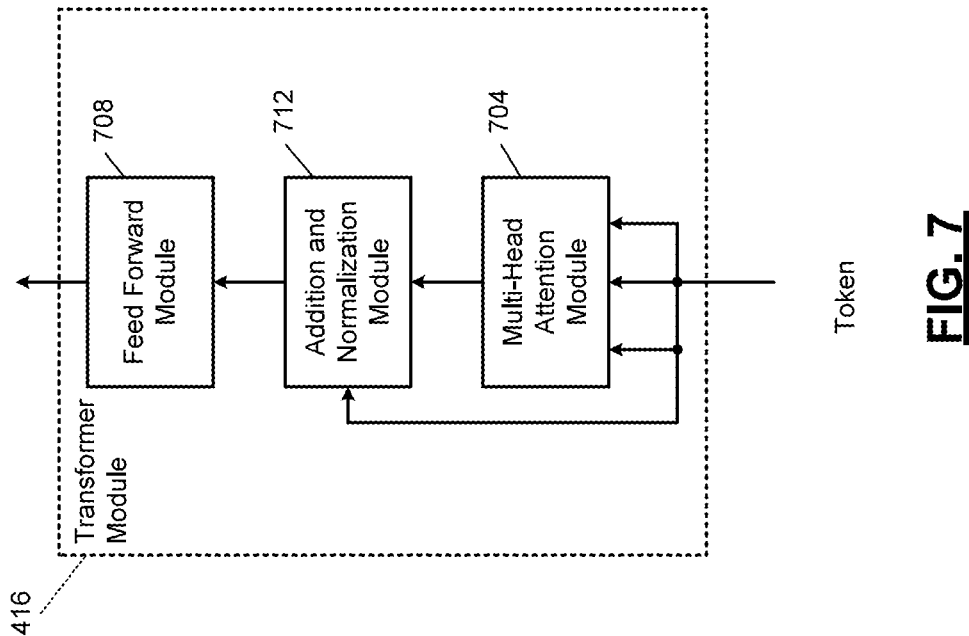
FIG. 7 is a functional block diagram of an example implementation of a transformer module.

FIG. 7 is a functional block diagram of an example implementation of a transformer module 416. The transformer module 416 includes a multi-headed attention layer or module including h "heads" which are computed in parallel. Each of the heads performs three linear projections called (1) the key K, (2) the query Q, and (3) the value V. The three transformations of the individual set of input features are used to compute a contextualized representation of each of the inputs. The scaled-dot attention applied on each head independently. Each head aims at learning different types of relationships among the inputs and transforming them. Then, the outputs of each layer are concatenated as head {1,h} and are linearly projected to obtain a contextualized representation of each input, merging all information independently accumulated in each head into M.

The heads of the Transformer architecture allow for discovery of multiple relationships between the input sequences.

The transformer module 416 may include a stack of N=6 identical layers. Each layer may have two sub-layers. The first sub-layer may be a multi-head attention mechanism (module) 704 (e.g., self-attention and/or cross-attention), and the second may be a position wise fully connected feed-forward network (module) 708. Addition and normalization may be performed on the output of the multi-head attention module 704 by an addition and normalization module 712. Concatenation may also be performed by the addition and normalization module 712. Residual connections may be used around each of the two sub-layers, followed by layer normalization.

Figures 8, 9:
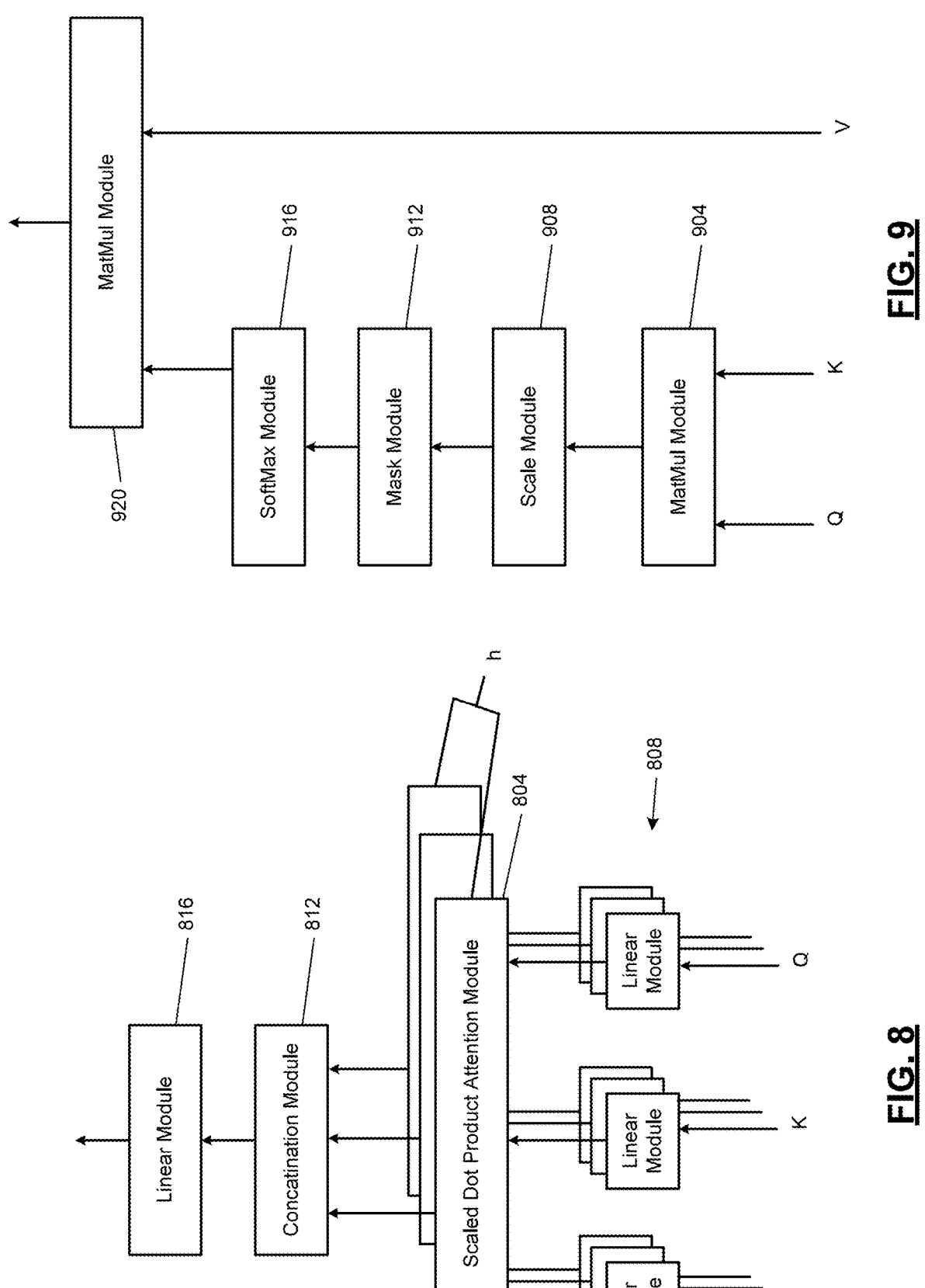
FIG. 8 includes a functional block diagram of an example implementation of a multi-head attention module.
FIG. 9 includes a functional block diagram of an example implementation of a scaled dot-product attention module of a multi-head attention module.

FIG. 8 includes a functional block diagram of an example implementation of the multi-head attention module 704. FIG. 9 includes a functional block diagram of an example implementation of a scaled dot-product attention module 804 of the multi-head attention module 704.

Regarding attention (performed by the multi-head attention module 704), an attention function may function by mapping a query and a set of key-value pairs to an output, where the query, keys, values, and output are all vectors. The output may be computed as a weighted sum of the values, where the weight assigned to each value is computed by a compatibility function of the query with the corresponding key.

In the scaled dot-product attention module, the input includes queries and keys of dimension $d_k$, and values of dimension $d_v$. The scaled dot-product attention module 804 computes dot products of the query with all keys, divides each by $\sqrt{d_k}$, and applies a softmax function to obtain weights on the values.

The scaled dot-product attention module 804 may compute the attention function on a set of queries simultaneously arranged in Q. The keys and values may also be held in matrices K and V. The scaled dot-product attention module 804 may compute the matrix of outputs based on or using the equation:

$$\text{Attention}(Q, VK, V) = \text{softmax}\left(\frac{QK^T}{\sqrt{d_k}}\right)V.$$

The attention function may be, for example, additive attention or dot-product (multiplicative) attention. Dot-product attention may be used in addition to scaling using a scaling factor of $$\frac{1}{\sqrt{d_k}}.$$

Additive attention computes a compatibility function using a feed-forward network with a single hidden layer. Dot-product attention may be faster and more space-efficient than additive attention.

Instead of performing a single attention function with d-dimensional keys, values and queries, the multi-head attention module 704 may linearly project the queries, keys, and values h times with different, learned linear projections to $d_k$, $d_q$ and $d_v$ dimensions, respectively, using linear modules 808. On each of the projected versions of queries, keys, and values the attention function may be performed in parallel, yielding $d_v$-dimensional output values. These may be concatenated and projected again, resulting in the final values, by a concatenation module 812 and a linear module 816 as shown. Multi-head attention may allow for jointly attention to information from different locations.

As shown in FIG. 9, a MatMul module 904 generates an output based on the query Q and key K values using the MatMul function. A scale module 908 may scale the output of the MatMul module 904 by one or more predetermined scalar values. A mask module 912 may mask one or more portions of the output of the scale module 908 to produce an output. In various implementations, the mask module 912 may be omitted.

A SoftMax module 916 may apply the softmax function to the output of the mask module 912. A MatMul module 920 generates an output to the concatenation module 812 based on the output of the SoftMax module 916 and the value V using the MatMul function. Additional information regarding the transformer architecture can be found in U.S. Pat. No. 10,452,978, which is incorporated herein in its entirety.

In various implementations, L (the number of propagation modules/layers) may be 12. The transformer modules 416 may have a hidden dimension of h=768. The hidden dimension of the BiGRU module 420 may be 384. The hidden dimensions of each propagation module/layer may be the same. The FFNN modules 424 may map the output of the BiGRU module 420 of dimension 2×384 to a dimension of 768. The FFNN of the output module 432 may include a binary classifier that projects the sentence representations of dimension 768 to an output of dimension 2.

The summarization module 220 may be trained by a training module based on a cross-entropy loss and using an Adam optimizer.

The summarization module 220 described herein is effective at summarizing long documents while preserving informativeness and fluency of the resulting summaries. The summarization module 220 even performs better than sliding window options because summaries require propagation of information beyond a single (and possibly sliding/moving) transformer window.

FIGS. 10, 11, and 12 are example illustrations of summaries based on long documents from different datasets that compare gold summaries (Gold) with of summaries generated by the summarization module 220 and another manner (Other). Parts of the summaries with darker highlight indicate a higher ROUGE score. As illustrated, the summaries produced by the summarization module 220 are at least as good as, if not better than, summaries produced in other ways.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A summarization system, comprising:

K embedding modules configured to:

receive a respective one of K blocks of text of a document to be summarized, wherein each of the K blocks includes:

a predetermined starting token at the front of that block;

a predetermined ending token at the end of that block; and tokens between the predetermined starting token and the predetermined ending token that represent the text of that one of the K blocks; and generate a respective one of K first representations based on the respective one of the K blocks of text, where K is an integer greater than 2 and the K first representations are one of matrices and vectors;

a first propagation module including first transformer layers having a transformer architecture and first bidirectional gated recurrent neural network layers, the first bidirectional gated recurrent neural network layers interleaved between the first transformer layers, the first propagation module configured to generate global and block specific second representations based on the K first representations and propagating local information from ones of the K blocks of text to the other ones of the K blocks of text, the global second representation including information for each of the K blocks of text and being one of a matrix and a vector, and the block specific second representations including information for the respective ones of the K blocks of text and being ones of matrices and vectors;

a second propagation module including second transformer layers having a transformer architecture and second bidirectional gated recurrent neural network layers, the second bidirectional gated recurrent neural network layers interleaved between the second transformer layers, the second propagation module configured to generate global and block specific third representations based on the second representations, the third representations being ones of matrices and vectors, the global third representation including information for each of the K blocks of text, and the block specific third representations including information for the respective ones of the K blocks of text;

an output module configured to select ones of the K blocks of text based on the third representations, wherein the output module includes a neural network and a softmax function configured to classify each of the K blocks of text, based on the third representations, as being either a first state or a second state and is configured to select the ones of the K blocks of text based on the classifications; and a summary module configured to generate a summary of the document from text of the selected ones of the K blocks of text.

2. The summarization system of claim 1 wherein the document to be summarized includes at least 1024 tokens.

3. The summarization system of claim 1 wherein the neural network includes a feed forward neural network.

4. The summarization system of claim 1 wherein:

the first transformer layers of the first propagation module include K transformer layers configured to receive the respective ones of the K first representations and to generate fourth representations based on the K first representations;

wherein the first bidirectional recurrent neural network layers of the first propagation module are configured to receive K first ones of the fourth representations and to generate K fifth representations based on the K first ones of the fourth representations;

the first propagation module further includes K feed forward neural network modules configured to generate K sixth representations based on the K fifth representations, respectively; and the second representations include (a) second ones of the fourth representations and (b) the K sixth representations.

5. The summarization system of claim 4 wherein the fourth representations are a group consisting of (a) the first K ones of the fourth representations and (b) the second ones of the fourth representations.

6. The summarization system of claim 4 wherein:

the second transformer layers of the second propagation module include K second transformer layers configured to receive the second representations and to generate seventh representations based on the sixth representations;

wherein the second bidirectional recurrent neural network layers of the second propagation module are configured to receive K first ones of the seventh representations and to generate K eighth representations based on the K first ones of the seventh representations;

the second propagation module includes K second feed forward neural network modules configured to generate K ninth representations based on the K eighth representations, respectively; and wherein the third representations include (a) second ones of the seventh representations and (b) the K eighth representations.

7. The summarization system of claim 4 wherein the K first ones of the fourth representations are K representations of classification (CLS) tokens of the K blocks, respectively.

8. The summarization system of claim 1 wherein the K first representations each include a token embedding, a segment embedding, and a positional encoding, the positional encoding representing a position of the token in its one of the K blocks.

9. The summarization system of claim 1 further comprising a third propagation module configured to generate fourth representations based on the third representations, wherein the output module is configured to select the ones of the K blocks based on the fourth representations.

10. The summarization system of claim 1 wherein the summary module is configured to store the summary in memory in association with the document.

11. The summarization system of claim 1 wherein the summary module is configured to transmit the summary to a computing device via a network.

12. The summarization system of claim 1 wherein: the predetermined starting token corresponds to a classification (CLS) token; the predetermined ending token corresponds to a separation (SEP) token; and the tokens between the predetermined starting token and the predetermined ending token correspond to at least one sentence of text from the document.

13. The summarization system of claim 1 wherein each of the first and second propagation modules includes (a) K transformer modules configured to independently determine dependencies locally within the K blocks of text and (b) a bi-directional recurrent neural network module configured to process output of the K transformer modules and to determine dependencies globally within the document.

14. The summarization system of claim 1 wherein at least one of the first bidirectional gated recurrent neural network layers includes one of a bidirectional gate recurrent unit (BiGRU) and a bidirectional long short-term memory (BILSTM).

15. A query system, comprising:

a search module configured to receive a query as input and obtain search results based on the query; and the summarization system of claim 1, wherein the summarization module is configured to produce summaries of the search results for the search module, wherein the search module is further configured to output the search results and the summaries of the search results produced by the summarization module.

16. A summarization system, comprising:

K means for:

receiving a respective one of K blocks of text of a document to be summarized, wherein each of the K blocks includes:

a predetermined starting token at the front of that block;

a predetermined ending token at the end of that block; and tokens between the predetermined starting token and the predetermined ending token that represent the text of that one of the K blocks; and generating a respective one of K first representations based on the respective one of the K blocks of text, where K is an integer greater than 2 and the K first representations are one of matrices and vectors;

a means including first transformer layers having a transformer architecture and first bidirectional gated recurrent neural network layers, the first bidirectional gated recurrent neural network layers interleaved between the first transformer layers, for generating global and block specific second representations based on the K first representations and propagating local information from ones of the K blocks of text to the other ones of the K blocks of text, the global second representation including information for each of the K blocks of text and being one of a matrix and a vector, and the block specific second representations including information for the respective ones of the K blocks of text and being one of matrices and vectors;

a means including second transformer layers having a transformer architecture and second bidirectional gated recurrent neural network layers, the second bidirectional gated recurrent neural network layers interleaved between the second transformer layers, for generating global and block specific third representations based on the second representations, the third representations being one of matrices and vectors, the global third representation including information for each of the K blocks of text, and the block specific third representations including information for the respective ones of the K blocks of text;

a means for selecting ones of the K blocks of text based on the third representations, wherein the means for selecting ones of the K blocks of text being for classifying each of the K blocks of text, based on the third representations, as being either a first state or a second state and selecting the ones of the K blocks of text based on the classifications; and a means for generating a summary of the document from text of the selected ones of the K blocks of text.

17. The summarization system of claim 16 wherein: the predetermined starting token corresponds to a classification (CLS) token; the predetermined ending token corresponds to a separation (SEP) token; and the tokens between the predetermined starting token and the predetermined ending token correspond to at least one sentence of text from the document.

18. A summarization method, comprising:

receiving K blocks of text, respectively, of a document to be summarized, wherein each of the K blocks includes:

a predetermined starting token at the front of that block;

a predetermined ending token at the end of that block; and tokens between the predetermined starting token and the predetermined ending token that represent the text of that one of the K blocks;

generating K first representations based on the K blocks of text, respectively, where K is an integer greater than 2 and the K first representations are one of matrices and vectors;

generating, using first transformer layers having a transformer architecture and first bidirectional gated recurrent neural network layers, the first bidirectional gated recurrent neural network layers interleaved between the first transformer layers, global and block specific second representations based on the K first representations and propagating local information from ones of the K blocks of text to the other ones of the K blocks of text, the global second representation including information for each of the K blocks of text and being one of a matrix and a vector, and the block specific second representations including information for the respective ones of the K blocks of text and being one of matrices and vectors;

generating, using second transformer layers having a transformer architecture and second bidirectional gated recurrent neural network layers, the second bidirectional gated recurrent neural network layers interleaved between the second transformer layers, global and block specific third representations based on the second representations, the third representations being one of matrices and vectors, the global third representation including information for each of the K blocks of text, and the block specific third representations including information for the respective ones of the K blocks of text;

selecting ones of the K blocks of text based on the third representations, the selecting ones of the K blocks of text including:

classifying each of the K blocks of text, based on the third representations, as being either a first state or a second state; and selecting the ones of the K blocks of text based on the classifications; and generating a summary of the document from text of the selected ones of the K blocks of text.

19. The summarization method of claim 18 wherein the K first representations each include a token embedding, a segment embedding, and a positional encoding, the positional encoding representing a position of the token in its one of the K blocks.

20. The summarization method of claim 18 further comprising generating fourth representations based on the third representations, wherein selecting ones of the K blocks includes selecting the ones of the K blocks based on the fourth representations.

21. The summarization method of claim 18 wherein the K blocks each include at least one sentence of text from the document.

22. The summarization method of claim 18 wherein: the predetermined starting token corresponds to a classification (CLS) token; the predetermined ending token corresponds to a separation (SEP) token; and the tokens between the predetermined starting token and the predetermined ending token correspond to at least one sentence of text from the document.

23. The summarization method of claim 18 wherein at least one of the first bidirectional gated recurrent neural network layers includes one of a bidirectional gate recurrent unit (BiGRU) and a bidirectional long short-term memory (BILSTM).

24. A method comprising:

receiving a query as input;

obtaining search results based on the query; and performing the summarization method of claim 18 to produce summaries of the search results; and outputting the search results and the summaries of the search results.

* * * * *